PERMEABILITY TUNED RECEIVER CIRCUITS

Filed Jan. 19, 1945

Inventor:
William S. Bachman,
by Harry E. Dunham
His Attorney.

Patented Apr. 25, 1950

2,505,516

UNITED STATES PATENT OFFICE 2,505,516

PERMEABILITY TUNED RECEIVER CIRCUITS

William S. Bachman, Fairfield, Conn., assignor to General Electric Company, a corporation of New York Application January 19, 1945, Serial No. 573,897

4 Claims. (Cl. 250—20)

Figure 1:
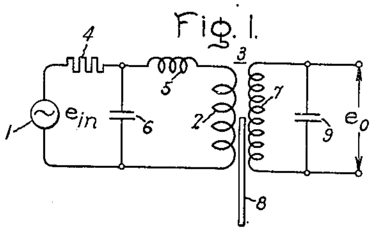

The present invention relates to receivers for radio signals and it is primarily concerned with the provision of new and improved permeability tuned circuits for such receivers.

In the usual radio receiver which is tuned by means of variable capacitors, it is the customary practice to provide primary coils on the antenna and radio frequency transformers which are resonated below the lowest frequency in the band covered by the receiver. This well known high impedance primary circuit has the advantage that the gain of the circuit is high at the low frequency end of the band which it is designed to cover, because of the near approach to the resonance frequency of the winding, while the gain at the high frequency end is aided by capacity added between the high radio frequency potential ends of the primary and secondary coils. The result is quite uniform gain across the entire band. In circuits tuned by varying the permeability of an inductance coil by means of movable powdered iron cores, considerable difficulty has been encountered in maintaining gain substantially constant over the frequency band through which the circuit is designed to operate in that, as a desired gain is obtained at one end of the range, at the opposite end the gain falls off rapidly since the resonance frequency of the overall circuit is quite far removed from that of the primary circuit of the transformer employed. Accordingly, it is an object of the present invention to provide a new and improved permeability tuned circuit for a radio receiver in which high and quite uniform gain is obtained over the entire signal band.

It is a further object of the present invention to provide a new and improved permeability tuned transformer arrangement which employs a low impedance primary circuit.

It is a still further object of the present invention to provide a new and improved permeability tuned transformer circuit for a radio receiver for receiving signals over a band in which the primary circuit of the transformer is resonated at a frequency higher than the highest frequency in that band.

It is still another object of the present invention to provide a new and improved permeability tuned transformer circuit in which the inductances of both the primary and secondary windings are varied uniformly over the frequency band of the circuit.

It is a still further object of the present invention to provide a new and improved permeability tuned transformer circuit in which the mutual inductance of the circuit varies substantially linearly with the inductance of the secondary winding of the transformer.

It is still another object of the present invention to provide a new and improved means of tracking an antenna circuit with a radio frequency circuit employing transformers in which the reactances coupled into the secondary circuits of the transformers are maintained substantially equal.

One of the features of the invention is the use in a radio frequency circuit of a permeability tuned transformer of the low impedance primary type in which an auxiliary inductance is connected in series with the primary winding and the closely coupled primary and secondary windings are so arranged in the transformer that, as the tuning of the secondary circuit is varied by variation of the inductance of the secondary winding, the inductance of the primary winding increases at the same rate as that of the secondary winding so that substantially uniform gain is maintained over the entire frequency range of the circuit and that tracking with other circuits of the receiver is facilitated.

Figure 2:
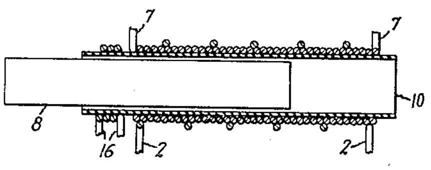
Figure 3:
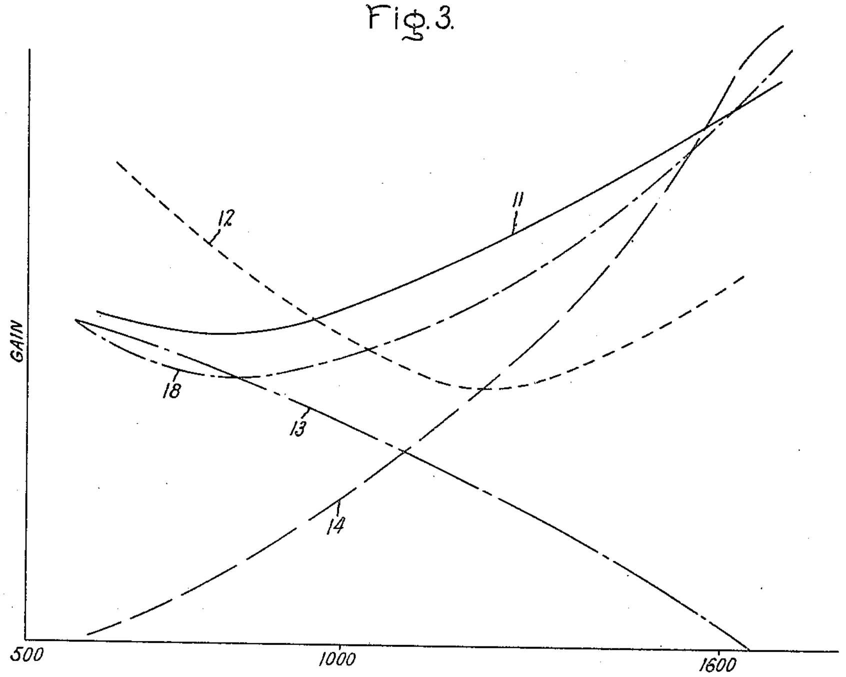
Figure 4:
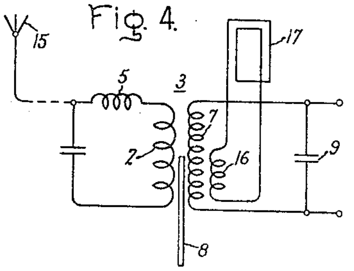
Figure 5:
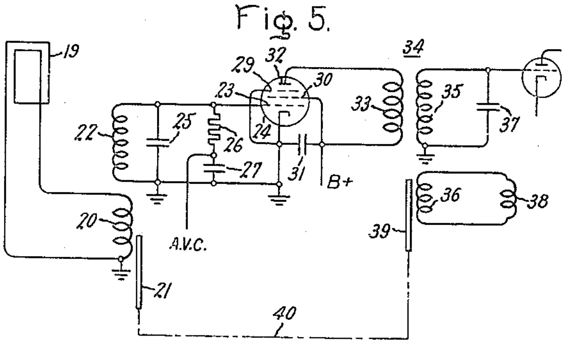

The novel features which I believe to be characteristic of my invention are set forth in the appended claims. My invention itself, however, together with further objects and advantages thereof, may best be understood by reference to the following description taken in connection with the drawing in which Fig. 1 illustrates a portion of a radio receiver circuit employing permeability tuning; Fig. 2 is a cross-sectional view of a transformer employed in the circuit of Fig. 1; Fig. 3 is a curve showing the gain versus frequency curve of the circuit of Fig. 1 and of other types of tuned radio frequency circuits; Fig. 4 is a modification of the circuit of Fig. 1; and Fig. 5 is a circuit suitable for tracking a permeability tuned loop antenna circuit with a permeability tuned radio frequency circuit.

Referring to Fig. 1, there is shown a source of radio frequency voltage 1 which is connected across a primary winding 2 of a radio frequency transformer 3 through a resistance 4 and an auxiliary inductance 5. The inductance of the primary winding circuit is resonated by a fixed capacitor 6. The radio frequency transformer 3 includes a secondary winding 7 and a magnetic core 8 of the powdered iron type for varying the permeability of the region within the windings 2, 7. The secondary winding 7 is resonated by a capacitance 9. The resonance frequency of the secondary circuit is varied over a range, which, for example, in a radio receiver is the usual broadcast range, by movement of the powdered iron core 8 to vary the permeability of the region within the winding 7. Preferably, the circuit of the primary winding 2 and the auxiliary inductance 5 is resonated by the capacitance 6 at a frequency greater than the highest frequency in the range of the secondary circuit.

In an actual circuit, the source of radio frequency signals 1 may take the form of an electron discharge device, the plate resistance of which forms the resistance 4 of the circuit of Fig. 1 and the interelectrode capacitance of which forms at least part of the capacitance 6. Alternatively, the source 1 may be an antenna of the capacitive type, elements 4 and 5 may comprise respectively the resistance and at least a part of the inductance of the antenna, and capacitance 6 may include the capacity-to-ground of the antenna.

Preferably, the transformer 3 has a primary winding which consists of a few turns which are wound coaxially and substantially co-extensive with the turns of the secondary winding 7 in order that, as the inductance of the winding 7 is varied by adjustment of the movable iron core 8, the inductance of the primary winding 2 varies in like manner and the movable core has the same influence on both windings. A transformer of the above type is illustrated in Fig. 2 in which the secondary winding 7 is wound as a solenoid on a dielectric form 10 and the primary winding 2 is wound spirally and evenly over the entire length of the secondary winding. The powdered iron core 8 is disposed within the form 10 and is movable axially through the coils 2 and 7.

One of the advantages of the transformer of Fig. 2 and its use in the circuit of Fig. 1 is that, as the resonance frequency of the secondary circuit is varied from the highest frequency in its range to the lowest frequency in its range, the gain of the circuits remains substantially constant. The inductance of the secondary winding 7 increases during such tuning. At the same time, because the tuned frequency is further removed from the resonance frequency of the primary circuit, the impedance of the primary circuit and the gain of the stage tend to decrease. However, the inductance of the primary winding 2 increases because of the movement of core 8 and, consequently, the mutual inductance of the circuit increases directly with the secondary inductance with a resultant diminution in the loss of gain as the lowest frequency is approached. This result can be shown mathematically if we let $$L_1=L_a+L_p \qquad (1)$$

where $L_1$ is the inductance of the primary circuit, $L_a$ is the inductance of the auxiliary coil 5, and $L_p$ is the inductance of the primary winding 2. As the primary circuit winding 2 is very closely coupled to the secondary winding 7, i. e., has a coupling coefficient approaching unity, and as the auxiliary coil 5 is not linked magnetically with the secondary winding 4, then $$K_1=\frac{M}{\sqrt{L_pL_2}} \qquad (2)$$

where $K_1$ is the coefficient of coupling of windings 2, 7, M is the mutual inductance of the transformer, and $L_2$ is the inductance of the secondary winding 7. Also, $$K=\frac{M}{\sqrt{L_1L_2}} \qquad (3)$$

where K is the coefficient of coupling of the entire primary circuit with the secondary circuit. Then $$L_p=\frac{K^2}{K_1^2}L_1 \qquad (4)$$

In actual practice, the value of $L_1$, the inductance of the entire primary circuit, is determined from the desired primary circuit resonant frequency. The necessary inductance $L_p$ of the primary transformer winding 2 is found by using the desired value of coupling coefficient K. The gain of such a transformer may be shown to have a value approximately of $$\text{gain}=\frac{e_{out}}{e_{in}}=\frac{X_mQ_2}{(X_{L_1}-X_{C_1})} \qquad (5)$$

where $C_1$ is the capacitance of the primary circuit and $Q_2$ is the quality of the secondary circuit. From the known reactance balance of the secondary circuit $$jX_{L_2}\left(1+\frac{K_1^2X_{L_p}}{(X_{C_1}-X_{L_1})}\right)-jX_{C_2}=0$$

The multiplying factor of the member $jX_{L_2}$ in the above equation indicates the amount of departure from the tuning curve of the secondary circuit alone that is caused by the primary circuit of the transformer circuit of Fig. 1. As previously stated, the primary winding 2 is resonated at a frequency above the highest frequency in the range of the secondary winding and the primary inductance increases as the frequency of the secondary circuit is decreased. It follows, therefore, that the term $$\frac{K_1^2X_{L_p}}{X_{C_1}-X_{L_1}}$$

remains more nearly constant than if the inductance of the secondary winding alone varied with the tuning of the transformer. As a result, the overall tuning range of the transformer is less restricted and tracking with other circuits is facilitated, as compared with systems in which the inductance of the primary winding of the transformer is not varied.

The advantages of the circuit arrangement of Fig. 1 employing the transformer illustrated in Fig. 2 are more clearly pointed out by reference to the curves of Fig. 3 in which curve 11 shows the variation in gain of the radio circuit of Fig. 1 as the frequency of the secondary winding is tuned over the usual broadcast range. Curve 12 shows the gain vs. frequency characteristic of the usual radio receiver circuit which is tuned by variable capacitances, in which circuits the gain of the stage is high at the low frequency end of the band because of the nearness in frequency to the resonance frequency of the primary circuit and the gain at the high frequency end of the range is aided by the capacity added between the high frequency potential ends of the primary and secondary coils. Curve 13 illustrates the gain versus frequency characteristic of a radio transformer circuit which uses permeability tuning, but in which the primary coil of the transformer is resonated to a frequency below the lowest frequency in the range. In such a circuit, the gain is high at the low frequency end, but, since the mutual inductance decreases as the secondary inductance is decreased to tune the secondary circuit, the gain falls off very rapidly. The circuit impedance decreases as the frequency decreases, since fixed tuning capacitors are used in permeability tuning systems so that capacity coupling does not increase the gain at the high frequency end of the band. Curve 14, as contrasted with curve 11, is the gain versus frequency characteristic of a permeability tuned stage in which, while the entire primary winding is resonated above the tuning range, the entire primary winding is placed adjacent one end of the secondary winding with a necessary spacing to get a desired coupling coefficient at the high frequency end of the band to be covered. From the curve, it is seen that the gain of the stage falls off rapidly as the low end is approached and the tuning is more removed from the primary resonance frequency. This is due to the fact that, because of the construction of the transformer, the primary inductance remains fixed and the mutual inductance therefore increases with the square root of the secondary inductance rather than directly as in the manner of the circuits of the present invention.

In the modification of the circuit of Fig. 1 shown in Fig. 4, the primary winding 2 is connected to an antenna 15 of the capacitive type. As explained previously in the discussion of the manner of determining the values of $L_a$ and $L_p$ for the circuit of the primary winding, the inductance 5 may be formed wholly or in part by the antenna 15 and its lead-in conductors. The transformer 3 includes a tertiary winding 16 which also is an energizing winding and which is connected in series with a loop antenna 17. The tertiary winding 16 preferably is a closely wound solenoid and is illustrated in Fig. 2 as supported on the dielectric form 10 adjacent that end of the secondary winding 7 into which the tuning core 8 enters. As the result of the disposition of windings 2 and 16 with respect to winding 7, the inductance of the primary circuit, which includes winding 2, is increased as the inductance of the secondary circuit is increased by a movement of the tuning core 8. However, the inductance of the tertiary circuit, which comprises the energizing winding 16 and the loop antenna 17, remains substantially constant as the position of the tuning core 8 within the windings is adjusted. The tuning characteristic of such a receiver is very similar to that of the circuit of Fig. 1 and is shown by the curve 18 of Fig. 3.

The circuit of Fig. 5 shows a portion of a permeability tuned receiver which includes an arrangement for tracking a permeability tuned radio frequency circuit essentially of the type illustrated in Fig. 4. In Fig. 5, a loop antenna 19 is connected in series with the primary winding 20 of a permeability tuned transformer having a movable magnetic tuning core 21. The secondary winding 22 has one of its terminals connected to the control electrode 23 of an electron discharge device 24. The device 24 is shown as of the pentode type having its control electrode 23 connected to the tuned input circuit comprising, in addition to the secondary winding 22, a capacitor 25. The control electrode 23 is connected to ground through a grid resistor 26 and a capacitor 27, automatic volume control potentials being connected to the point between the elements 26, 27. The cathode 28 of the device is connected directly to ground and a suppressor grid 29 is directly connected to the cathode. The potentials for the screen grid 30 may be supplied from any suitable source, indicated merely by the legend B+, and the screen grid is by-passed to the cathode by means of capacitor 31. The anode 32 is connected to the primary winding 33 of a radio frequency transformer 34 and which includes a secondary winding 35 and a tertiary winding 36. The secondary winding 35 is shunted by tuning capacitor 37, while the tertiary winding 36 is connected in series with a small inductance coil 38 whose function is to simulate a dummy antenna loop which is coupled to the secondary circuit of the transformer 34.

The primary and secondary windings 20, 22 of the antenna transformer preferably are constructed in the manner of windings 16 and 7 of the transformer shown in Fig. 4, while the tuning core 21 enters into the secondary winding 22 through the primary winding 20 in the same manner that the core 8 operates in the structure of Fig. 2. Since a loop antenna is employed, it is desirable that the inductance of antenna 19 and primary winding 20 be proportioned to provide a maximum gain. In order that the gain be maintained, winding 20 is concentrated at one end of the transformer structure so that movement of core 8 produces little change in the inductance of this primary winding. The transformer 34 preferably is constructed exactly as is shown in Fig. 2, the primary winding 33 corresponding to the winding 2 being wound over the entire length of the secondary winding 35, and the tertiary winding 36 being concentrated at the end of the secondary winding into which the tuning core 39 enters.

The inductance 38 preferably is given the same value as the inductance of the loop antenna 19. It has been found that, when the inductance 38 is thus coupled into the primary of the radio frequency transformer 34, the same reactance is coupled into the secondary circuits of both the antenna and radio frequency transformers. As a result, excellent tracking of these circuits is obtained if the cores 21, 39 are mechanically linked as indicated by the dashed line 40 for unicontrol operation. Moreover, in a receiver using the circuit of Fig. 5, it has been found that very nearly optimum sensitivity results when the primary winding 33 alone is used in the anode circuit of tube 24.

It is thus seen how a desired gain versus frequency characteristic of a permeability tuned circuit may be obtained by resonating the primary winding of the transformer at a frequency above the highest frequency of the range to be covered and by disposing the primary winding with respect to the secondary winding such that the mutual inductance of the windings increases as rapidly as the secondary inductance of the transformer increases.

While I have shown and described my invention as applied to particular systems embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. The combination, in a radio receiver, of a radio frequency transformer having three windings, a loop antenna connected in direct series circuit relation with one of said windings, means for resonating a second of said windings, means including a movable magnetic member for varying the resonance frequency of said second winding over a range of frequencies, said first and said second windings comprising a pair of co-extensive coils wound one upon the other and said third winding being so spaced longitudinally of said second winding that as said magnetic member is moved to tune said second winding through said range the inductance of said one winding is maintained substantially constant and the inductances of said other windings are varied at substantially the same rate.

2. In a radio receiver, the combination of an input circuit comprising a loop antenna, a transformer having a primary winding connected in direct series circuit relation with said antenna, a radio frequency amplifier connected to amplify signals from said input circuit comprising a radio frequency transformer having a primary winding, each of said transformers having secondary windings magnetically coupled to their respective primary windings, and magnetic means for varying the inductance of said secondary windings, the magnetic means for said transformers being mechanically linked for simultaneous adjustment of the resonance frequency of said secondary windings to translate a received signal, and a fixed inductance coupled into the secondary winding of said radio frequency transformer and having an inductance substantially equal to that of said antenna.

3. The combination, in a radio receiver, of an antenna, a transformer having a primary winding serially connected with said antenna, a radio frequency transformer connected with said first transformer for translating current therefrom and having a primary winding, each of said transformers having secondary windings coupled to said primary windings, means for tuning said secondary windings, unicontrolled magnetic means for varying the tuning of said secondary windings, and means for coupling into the secondary winding of said radio frequency transformer an impedance substantially equal to that coupled into the secondary winding of the other of said transformers.

4. The combination, in a radio receiver, of an antenna, a transformer having a primary winding serially connected with said antenna, a radio frequency transformer connected with said first transformer for translating currents therefrom and having a primary winding, each of said transformers having secondary windings coupled to said primary windings, means for tuning said secondary windings, unicontrol means for varying the tuning of said secondary windings, and means for coupling into the secondary winding of said radio frequency transformer an impedance substantially equal to that coupled into the secondary winding of the other of said transformers, said last means comprising a tertiary winding and an inductance connected in series, said inductance having a value substantially equal to that of said antenna.

WILLIAM S. BACHMAN.

REFERENCES CITED

The following references are of record in the file of this patent:

UNITED STATES PATENTS

| Number | Name | Date |
|---|---|---|
| 2,106,226 | Schaper | Jan. 25, 1938 |
| 2,141,254 | Schaper | Dec. 27, 1938 |
| 2,165,468 | Farrington | July 11, 1939 |
| 2,203,442 | Pressley | June 4, 1940 |
| 2,283,926 | Harvey | May 26, 1942 |
| 2,290,825 | Landon | July 21, 1942 |
| 2,334,670 | De Cola | Nov. 16, 1943 |
| 2,449,148 | Sands | Sept. 14, 1948 |